July 11, 1950 — M. P. CHAPLIN — 2,515,113
METHOD OF PRODUCING MOLDED FIBER ARTICLES
Filed Dec. 17, 1943 — 3 Sheets-Sheet 1
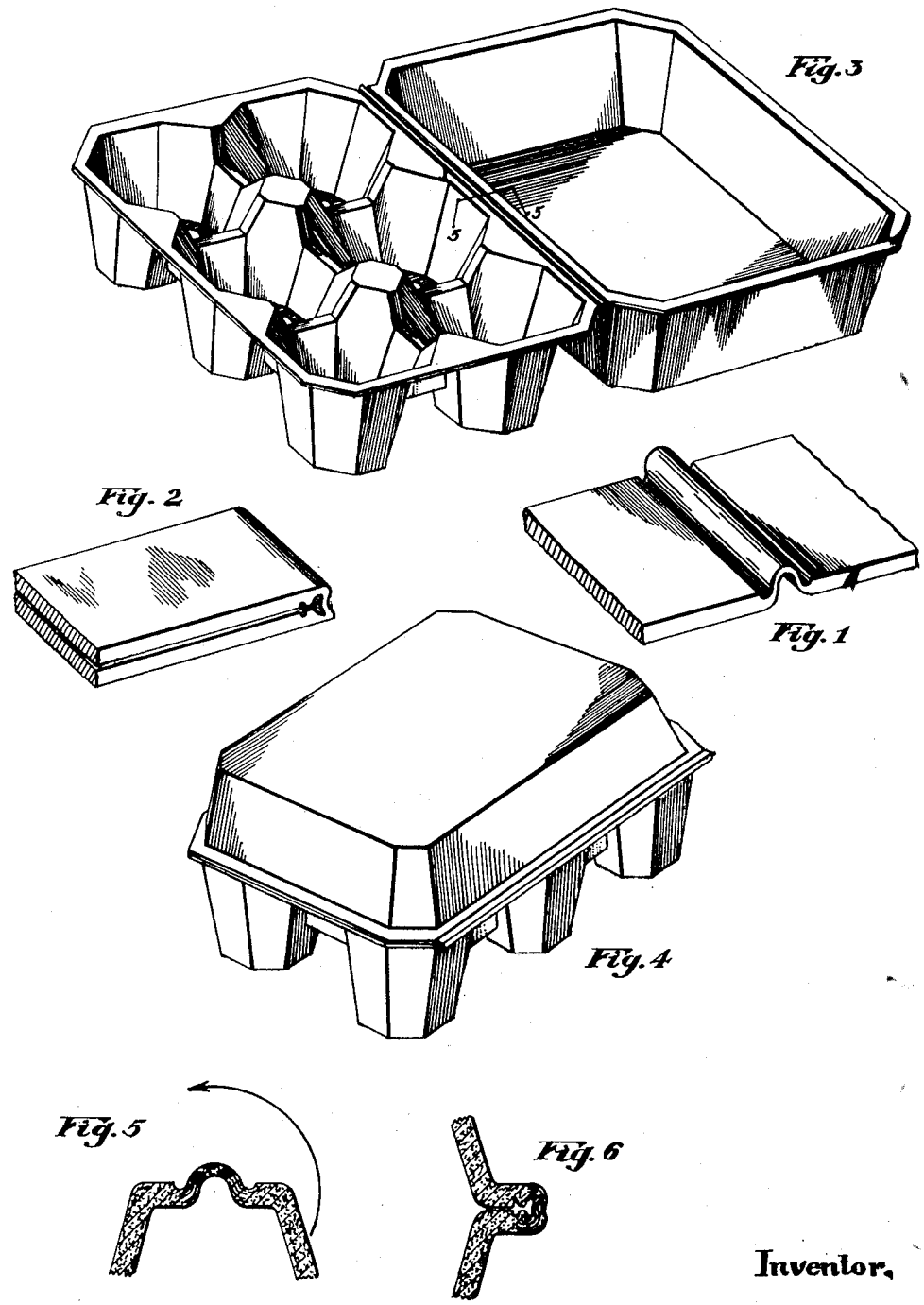
Inventor,
Merle P. Chaplin Inventor,
Merle P. Chaplin July 11, 1950　　　　M. P. CHAPLIN　　　　2,515,113
METHOD OF PRODUCING MOLDED FIBER ARTICLES
Filed Dec. 17, 1943　　　　　　　　　　3 Sheets-Sheet 3

Inventor
Merle P. Chaplin

Patented July 11, 1950

2,515,113

UNITED STATES PATENT OFFICE 2,515,113

METHOD OF PRODUCING MOLDED FIBER ARTICLES

Merle P. Chaplin, South Portland, Maine, assignor to Chaplin Corporation, South Portland, Maine, a corporation of Maine Application December 17, 1943, Serial No. 514,683

7 Claims. (Cl. 92—54)

This invention has to do with a novel method of providing a hinge or other flexible or yielding structures as a part of and integral with a molded fibre article.

Molded fibre articles are made by two general methods. One method is to mold or form the articles from a mixture of liquids and pulp or other fibre, and after molding or forming, the article is removed from the dies and dried in an oven. This provides an article of relatively loosely interlocked fibres, and is generally soft and with comparatively little mechanical strength. Its surface is generally rough and uneven, having the wire or other marks of the forming die on one side, and on the other side the fibres are generally uneven, rough, and loose.

The other method of producing molded fibre articles is to form the article in much the same manner as heretofore described, or from a liquid mixture of fibres and usually water, but after forming in one or more sections, the article or the sections which make up the article are united and finished between heated dies, which compress the loose fibres into compact relation with each other, thereby adding much to the strength and sturdiness of the article, and at the same time imparting a smoothness or finish to one or both surfaces. The article made by this method is free from warpage or distortion, as it is taken from the finished dies in an exact size and shape, while articles dried in ovens warp and change their shape considerably during the drying operation.

With either type of article it is frequently desirable to have sections of an article hingedly connected with each other, or to provide in some portions of the article a yielding area against which a fragile article can be placed with a minimum danger of breaking the article so packed, while the remainder of the article is stiff, rigid and strong.

With molded fibre articles produced by the first mentioned process, or where they are formed from a liquid pulp mixture, and dried in ovens, a certain degree of softness is obtained which in some cases is adequate. However, this cushioning effect is not as great as is sometimes desirable or necessary, and is usually uneven, and depends considerably on the character of fibres used, and the conditions under which they are oven dried. If such an article is over-dried the fibres are hardened and made more or less brittle, and much of the softness is destroyed.

At the best such an article is widely variable from both its texture and surface appearance, as well as its shape is variable due to distortion in drying.

These difficulties can be entirely obviated by drying the article between heated dies, thereby compacting the fibres together and rendering the entire structure integrally uniform, strong and durable; of considerably less bulk and thickness; with the surfaces smooth and attractive, and accurate as to size and shape.

To provide a flexible or hinged structure with the oven dried article, the area where the hinge is required may be weakened by perforating the sheet through this particular area, or holes may be cut in it to provide area where the article will bend easier than anywhere else. Sometimes the article is weakened by providing an area in the forming die over which the pulp forms with difficulty or with a weakened sectional area.

At the best, however, such methods are simply expedients, and while all of these provide an area in the molded fibre product enough weaker than the other areas so that, in effect, a hinge structure is secured, frequently these hinges are weak, and fail to serve their complete and desired purpose.

Further, any methods of providing soft areas over molded fibre surfaces is subject to so many variables, and the softness is limited very much by the thickness of the pulp or other fibres employed, that such a method of providing a cushion area is, at best, simply an expedient which very often fails to provide the necessary cushioning effect or one which is advantageous in the packing of such articles such as eggs.

As illustrative of the methods which I employ in the making of hinge or cushion sections on molded fibre articles, reference is made to the following figures:

Figure 1 shows a typical hinge section produced according to my method.

Figure 2 shows the same hinge section in closed position.

Figure 3 shows one of the many types of egg cartons to which this type of hinge can be applied. This view shows the carton open.

Figure 4 shows the carton of Figure 3 with the cover closed.

Figure 5 is a section on line 5—5 of Figure 3 through the hinge structure with the cover of the carton in open position.

Figure 6 is a section through the hinge with the cover in closed position.

Figure 13:
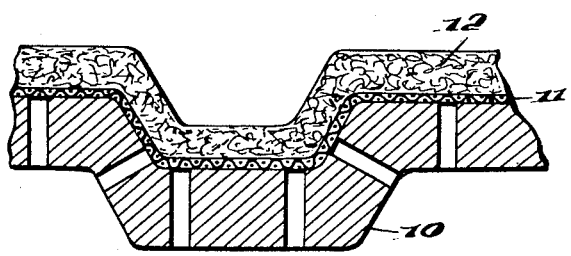
Figure 15:
Figure 14:
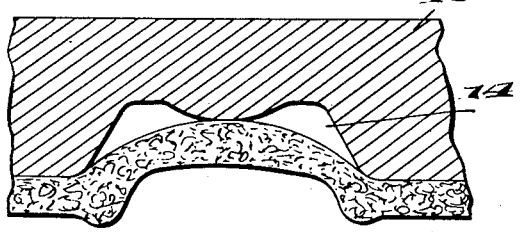

Figures 13, 14, and 15 show successive stages in the forming of a cushion section integral with the remainder of a molded fibre article.

Figure 16:
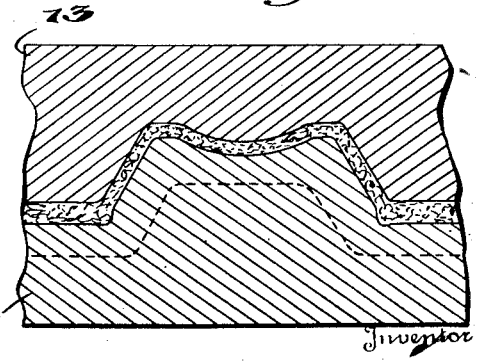

Figure 16 shows a section of a molded fibre article with a cushion suitable for supporting an egg.

Figure 17:

Figure 17 shows a section of a molded fibre article adapted to cushion an egg on the interior of a molded container having substantially rigid walls.

All of the foregoing figures with the exception of Figures 3 and 4 show the article sections somewhat enlarged.

In order to provide either hinge or cushion section in a molded fibre product it is desirable and necessary, in order that adequate support be given to a cushion, or adequate strength and durability to a hinge, that a strong fibre structure be retained, but there be added to it such other qualities as are necessary in order to provide flexibility for a hinge or yield for a cushion.

Referring particularly to Figures 7, 8, 9, and 10, this shows one method of providing a strong sturdy hinge structure of marked flexibility, utility, and strength.

Figure 7:
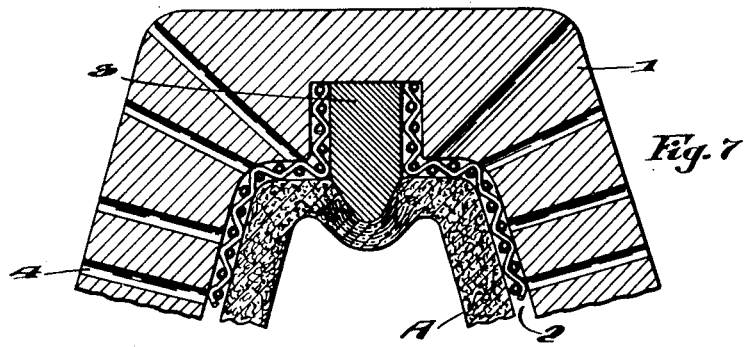
Figure 7 illustrates one method of initially suction forming the fibre sheet, whereby the fibres are drawn lengthwise across that part of the article where the hinge is to be made.

The section of the article through the hinge is first formed on a foraminous die of conventional construction as shown in Fig. 7. Preferably the wire screen sections of the die covering 2, overlying or covering the die 1, are locked in place by a retaining member 3, as shown in Fig. 7. The article is formed on the die 1, by vacuum or suction, the water being drawn through the screen mesh covering 2, through holes 4, and into a chamber back of the die in a conventional manner. This leaves a layer of fibres on the die as shown at A.

Over that section of the article where it is desired to have the hinge, the fibres are preferably drawn on generally lengthwise across the locking bar 3, as the only thing which will deposit a fibre over this area is suction around the sides of the bar and through the screen. Therefore, the fibres of the material will tend to cross the bar at right angles rather than being drawn on lengthwise of the bar. While the use of this bar 3, and the method of drawing the fibres into a pre-determined position is preferable, it is sometimes not necessary, although I would prefer to use this preliminary method in the original formation of the article. When the bar 3 is employed, that portion of the fibre layer deposited from the bar is in the form of a protuberant portion, more particularly, a protuberant bead, as shown in Figures 7, 8 and 9.

Figure 8:
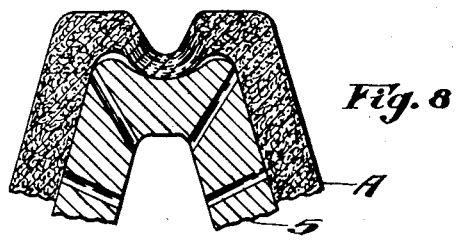
Figure 8 shows the article removed from the forming die of Figure 7 and held by a transfer die.

After being formed on the die 1, the article is removed therefrom by a transfer die 5, of Fig. 8, and is transferred to a finishing die 6, which is preferably heated by any well understood means—none being shown here.

Figure 9:
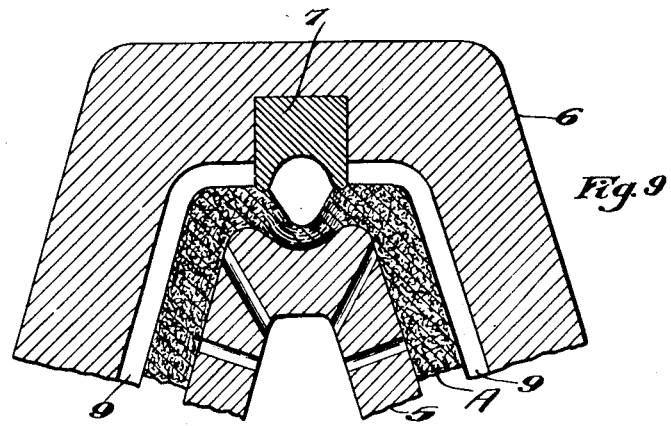
Figure 9 shows the article on a transfer die about to be transferred to one of a pair of finishing dies.

In this die 6, and shaped in the opposite direction to the locking bar 3, of die 1, is a member 7, which may be made a part of the die, located as shown in Fig. 9.

Figure 10:
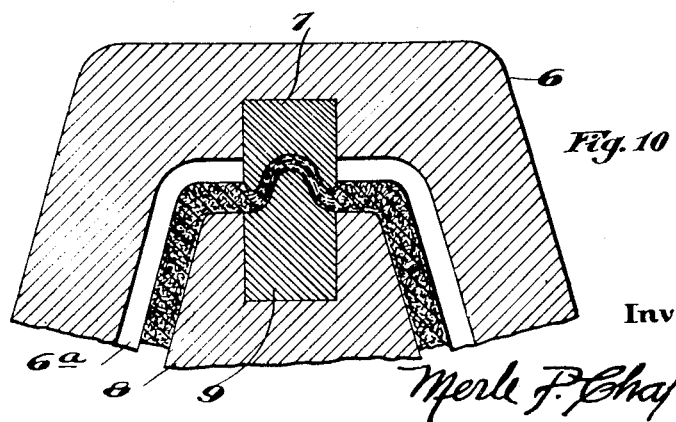
Figure 10 shows the article being finished between a pair of heated finishing dies, and the hinge being finally reshaped and finished in its final form.

The transfer die 5, deposits the freshly formed wet article, shown generally at A on the heated die 6, and immediately thereafter, a second heated die 8, contacts the opposite face of the article and compresses the fresh wet article between them as shown in Fig. 10.

This die 8, has a bar 9, which may be made a part of the die, located to match the bar 7, in die 6, to compress the protuberant part of the freshly formed article into a reverse position from its original formation as indicated in Figs. 7 and 8. This further tends to draw the fibres lengthwise the section shown in Fig. 10 or crosswise the hinge, and this area is compressed tightly between members 7 and 9 and finished in the position or shape shown in Fig. 10. In other words, during this operation, that portion of the fibre layer which constitutes the protuberant part is stretched transversely and fibres thereof are arranged in the direction of the stretching force. Consequently, in the resulting attenuated reversed protuberance, the preponderance of the fibres extend transversely of the protuberance.

The remainder of the article surfaces are finished between the dies 6 and 8, and due to the heat applied to these dies, (by means not shown) the water remaining in the article after the original formation on the die of Fig. 7, is driven off in the form of water vapor or steam, this escaping through slots or recesses 6a in die 6.

By the methods here shown in Figs. 7, 8, 9, and 10, the initial formation of molded fibre made from a mixture of fibres and liquids, is preferably such that the fibres have a tendency to be drawn lengthwise, i. e. transversely of, across the hinge area and bent or formed in a particular shape as indicated in Fig. 7.

While this area or section of the article is still moist and the fibres capable of being drawn and reshaped before being finally bonded in finished form, the protuberant shape is changed or reversed from that shown in Figs. 7 and 8 to that shown in Fig. 10. This further tends to draw out the fibre section through the hinge without unduly upsetting the inter-locking of the fibres over the hinge area. It does, however, make this section of the article through the hinge more durable and flexible than would be the case if a similar action was performed on a flat sheet, or one which has not been formed in the section shown in Fig. 7.

In other words, the method disclosed in Figs. 7, 8, 9, and 10 provides a stronger hinge structure and one which will permit of more continued re-use than would be the case if the hinge structure had been formed without the particular methods here disclosed.

For forming hinge members where requirements are not so severe, and which perhaps may be used as a cushion or yielding member as well as a hinge, I may perform the operations of Figs. 9 and 10 without necessarily having an initially shaped protuberant area in the hinge portion as shown in Fig. 7. In this case the fibres are drawn out of their original position and the area so treated is made more flexible and yielding without materially losing strength and toughness and is particularly advantageous where it is desired to form a cushion or yielding portion within a molded fibre article structure. It should be here pointed out that the changed shape of the portion of the article forming the hinge or for forming the cushion area, is performed while the fibre mass is still wet and the fibres loosely formed together. At this stage of production, the fibres can be moved or drawn relative to each other, while if any such attempt was made after the fibres had been finally set and dried, the result would be a rupture in the article. I have already pointed out, that where flat board sheets are employed to fabricate an article of this kind, flexibility can only be secured by shredding or cutting the sheet, as it is not possible to draw it out into a new shape as is the case where it is wet formed in dies, and reshaped or formed into a new position while still wet and pliable, for particular purposes and results.

It should also be noted that the area directly concerned with the hinge, is pressed hard and compact, which further gives this section strength and toughness without stiffness.

It should also be observed that the thickness of the wet freshly formed sheet indicated in Figs. 7, 8, and 9 is reduced to approximately half its thickness by being compacted and finished between dies 6 and 8 as indicated in Fig. 10.

This compacting and holding of the wet sheet in compressed position during drying results in a denser stronger sheet, and one having a smooth attractive surface. For utility it means that the article, oven dried, would have a thickness equal to or greater than that shown in Figs. 7, 8, and 9, while if the article is finished between dies, its thickness can be reduced to one-half, or even less if desirable, greatly reducing the space occupied by the cartons before use, and providing added space within the cartons for other products to be packed therein.

For forming a cushion member, say for the bottom of an egg cavity, which provides extreme flexibility and yieldability, and also will adapt itself to the shape of the bottom of the egg, I preferably employ the methods shown in Figs. 13, 14, 15, and 16.

With the method here shown, the original sheet or area in which it is desired to form a cushion, can be partly formed with its shape in the opposite direction, as I have already described in connection with the hinge of Figures 7–10 inclusive. However, I may form the cushion member directly from a freshly formed flat wet sheet or area. This sheet or area is shown generally in Fig. 13, the forming die being indicated generally at 10, the screen covering at 11, and the fibre deposit at 12. This wet sheet or area is then placed on one of a pair of drying and finishing dies 13, in which die there is a depression area indicated generally at 14, shaped to form what is desired for a cushion area on one side of the finished article. The complementary die 15, is then brought into cooperation with the die 13, with the article between them, and the area of fibre over which it is desired to form the pocket is reshaped while wet from its original protuberant form to the reversed attenuated protuberant form shown generally in Fig. 15.

It will be observed that the fibres over the area of the article which it is desired to form the cushion, were stretched or drawn while wet, thereby drawing them out one with the other, and rendering this section yieldable and also somewhat thinner than the main body of the article. The finished cushion area is shown in Fig. 16.

In Fig. 17 is shown a similar protuberant cushion area formed in the inside of a surface or cavity in a molded fibre article such as an egg carton. Here the same methods are employed as have been previously described, and the cushion area is made of any desired size and height.

Figures 1 to 6 inclusive show the application of this hinge structure to one form or style of an egg carton. These illustrations show one use for the structures here described, but are not to be taken as limiting the utility of this method or of the ideas here disclosed to the particular type of carton illustrated in Fig. 4.

Figure 11:
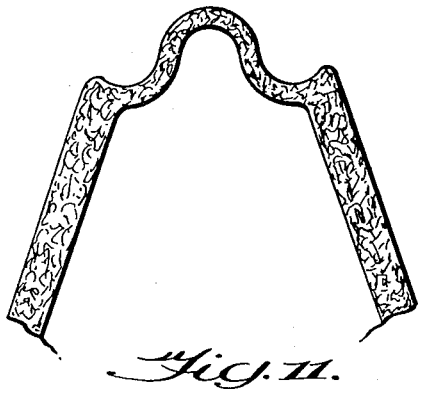
Figure 11 shows a modified type of hinge structure produced by the method similar to that shown on the previous figures.
Figure 12:
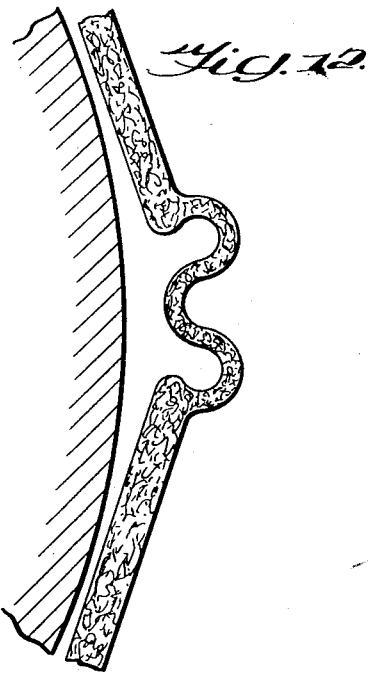
Figure 12 shows the hinge structure on Fig. 11 when the two portions connected by the hinge have been moved into a closed carton position.

For providing a combination of a hinge, as well as a cushion member, I may form the hinge area initially as shown in Fig. 11, employing one or all of the methods here disclosed for producing this initial hinge formation. This can be used in the side wall of a carton, for packing eggs, or between the carton and the cover section, and when the carton is closed, this hinge takes the position shown in Fig. 12. It will be observed that the structure or hinge area shown in Fig. 12 is a double cushion area over a part of the carton, and would be more yielding than the hinge structure shown in Fig. 6. Similarly, this hinge structure takes up less room outside the carton and it would be particularly desirable as a hinge structure on an egg carton where the carton size is limited by the packing case in which it is used. This type of hinge structure is produced by the methods herein described.

Having thus described my invention, what I claim is:

1. The herein described method which comprises: forming from a liquid-fibre mixture a layer of wet fibre having a protuberant portion projecting from one face of the layer, thereafter retroverting the protuberant portion of the layer to reverse its protuberancy from the face of the layer at which it was formed to the opposite face thereof while said layer remains in wet form, and thereafter compressing the entire layer between heated dies to dry and set said layer with the protuberant portion in its said reversed condition.

2. The herein described method which comprises: suction forming from a liquid-fibre mixture a layer of wet fibre having a protuberant portion projecting from one face of the layer and in which the fibres are predominantly laid in a direction transversely of the protuberant portion, thereafter retroverting the protuberant portion of the layer to reverse its protuberancy from the face of the layer at which it was formed to the opposite face thereof while said layer remains in wet form, and thereafter compressing the entire layer between heated dies to dry and set said layer with the protuberant portion in its said reversed condition.

3. The herein described method which comprises: forming from a liquid-fibre mixture a layer of fibre in wet form having at least one protuberant bead projecting from one face thereof, thereafter retroverting said protuberant bead of the layer to reverse its protuberancy from the face of the bead at which it was formed to the opposite face thereof while the layer remains in wet form, and thereafter compressing said protuberant bead between heated dies to dry and set it in its said reversed condition.

4. The herein described method which comprises: forming from a liquid-fibre mixture an article embodying a pair of wet pulp sections connected to one another by an intermediate integral protuberant hinge section bead of wet pulp projecting from one face of the article, thereafter retroverting said bead while it remains in wet form to reverse its protuberancy from the face of the article at which it was formed to the opposite face thereof, and compressing the bead as well as the sections on both sides thereof between heated dies to dry and set the article with the bead in said reversed condition.

5. The herein described method which comprises: forming from a liquid-fibre mixture a receptacle embodying body and cover sections connected to one another by an intermediate integral protuberant hinge section bead of wet fibre projecting from one face of the receptacle, thereafter retroverting said bead while it remains in wet form to reverse its protuberancy from the face of the receptacle at which it was formed to the opposite face thereof, and compressing the bead thus retroverted as well as the body and cover sections of the receptacle between heated dies to dry and set the receptacle with the bead in said reversed condition.

6. The herein described method which comprises: suction forming from a liquid-fibre mixture an article embodying a pair of wet fibre receptacle sections connected to one another by an intermediate integral hinge section of wet fibre in which the fibres are predominantly laid in a direction transversely of said hinge section, thereafter transversely stretching and attenuating the said intermediate hinge section to form a hinge bead between contiguous portions of the said wet fibre receptacle sections, and compressing the bead and receptacle sections between heated dies to dry and set the article with the bead in said attenuated condition.

7. The herein described method which comprises: suction forming from a liquid-fibre mixture a receptacle embodying wet fibre body and cover sections connected to one another by an intermediate integral wet fibre hinge section, thereafter transversely stretching and attenuating the said intermediate hinge section to form a hinge bead between the body and cover sections while the fibres of all of said sections remain in wet condition, and compressing the bead and body and cover sections between heated dies to dry and set the article with the bead in attenuated condition.

MERLE P. CHAPLIN.

REFERENCES CITED

The following references are of record in the file of this patent:

UNITED STATES PATENTS

| Number | Name | Date |
|---|---|---|
| 1,796,794 | Koppelman | Mar. 17, 1931 |
| 1,893,497 | Gray | Jan. 10, 1933 |
| 1,983,554 | Manson | Dec. 11, 1934 |
| 1,984,384 | Sheffield | Dec. 18, 1934 |
| 2,078,488 | Farnham | Apr. 27, 1937 |
| 2,081,740 | Farnham | May 25, 1937 |
| 2,100,516 | Read | Nov. 30, 1937 |
| 2,171,413 | Chaplin | Aug. 29, 1939 |
| 2,245,014 | Sherman | June 10, 1941 |
| 2,272,920 | Merta | Feb. 10, 1942 |
| 2,369,488 | Perry | Feb. 13, 1945 |